Oct. 3, 1967  R. H. BERG ETAL  3,345,502
PULSE ANALYZER COMPUTER

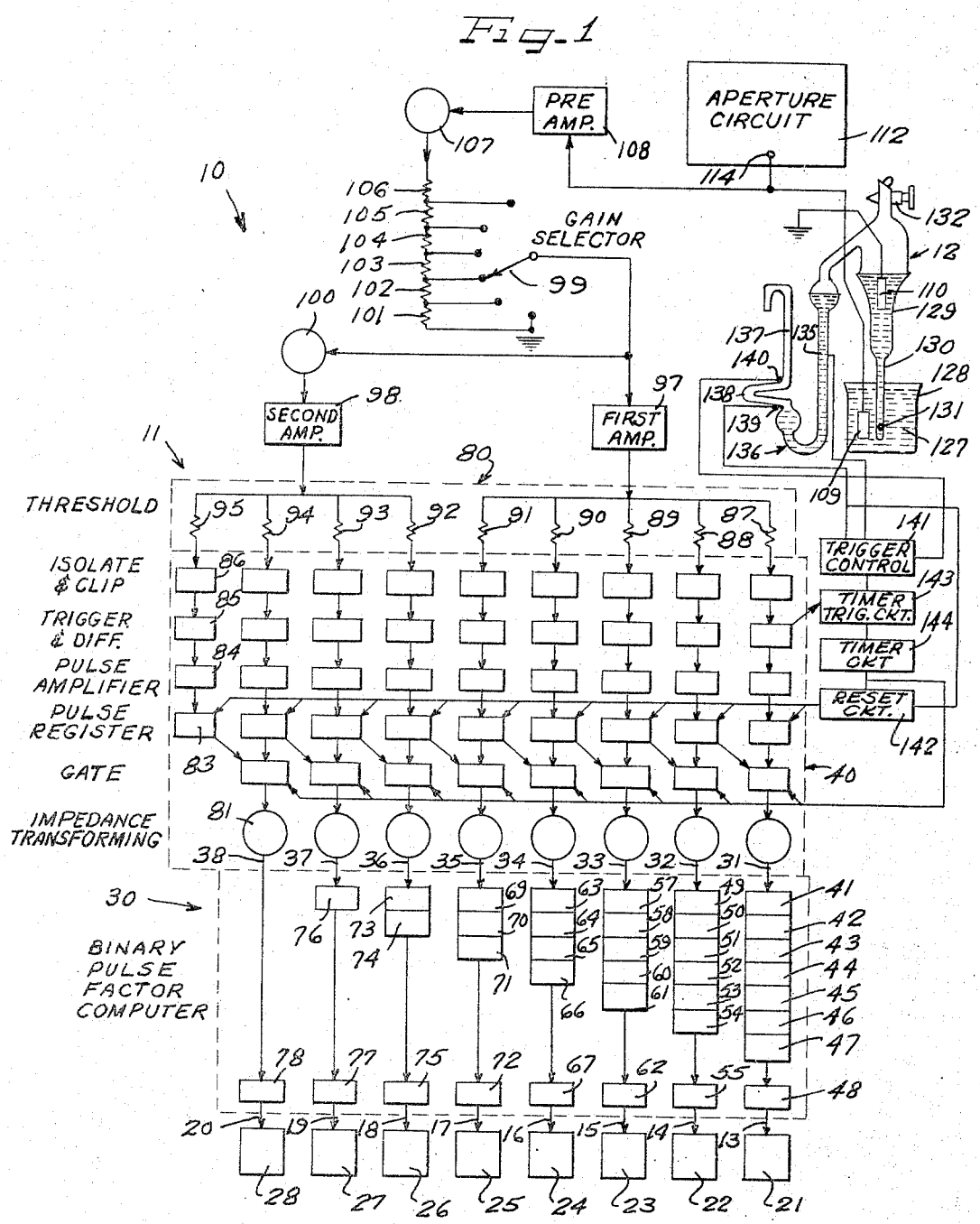

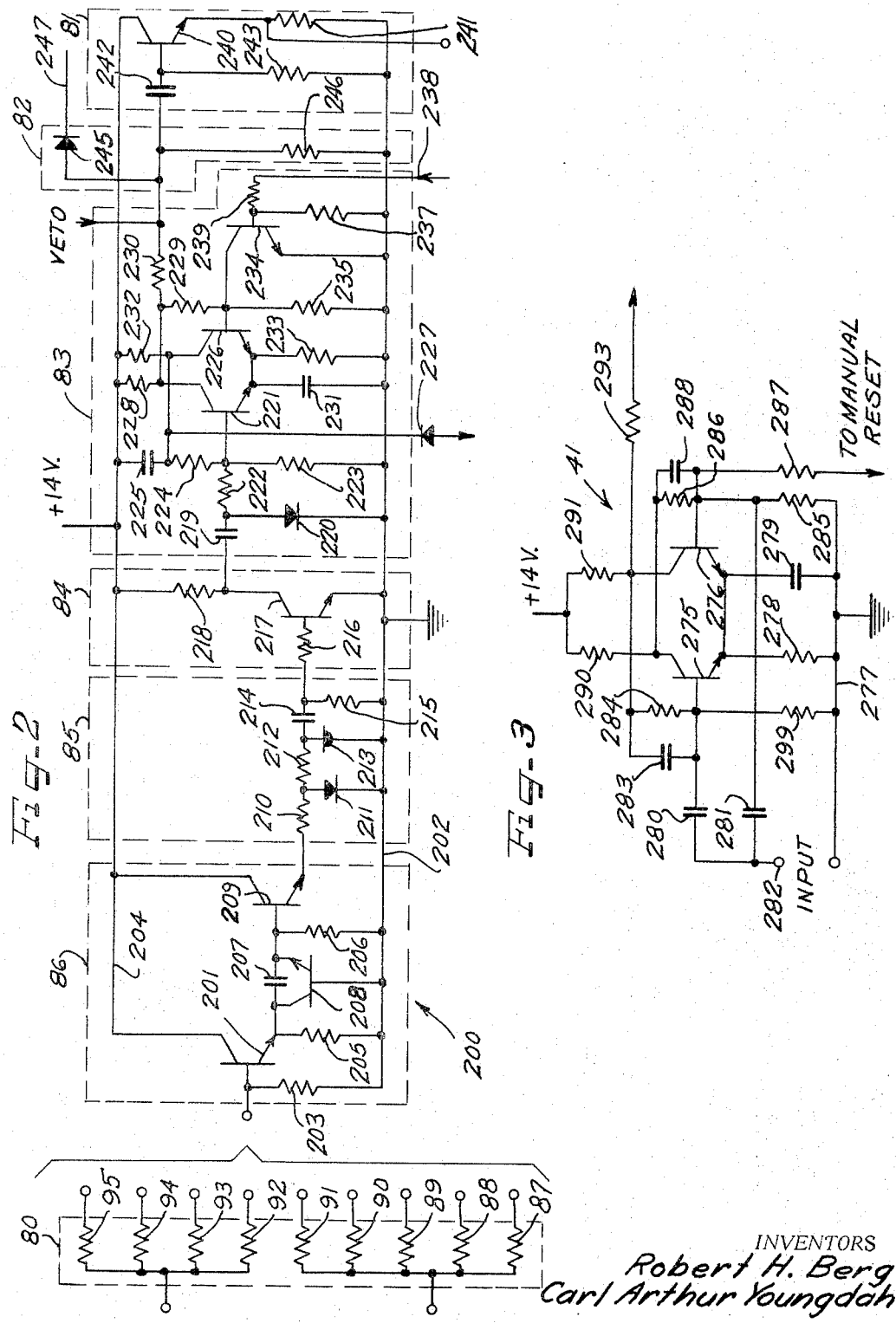

Filed Aug. 14, 1964  3 Sheets-Sheet 3

INVENTOR.
Robert H. Berg
Carl Arthur Youngdahl
BY
ATTORNEYS

United States Patent Office 3,345,502
Patented Oct. 3, 1967

3,345,502
PULSE ANALYZER COMPUTER
Robert H. Berg and Carl Arthur Youngdahl, Elmhurst,
Ill., assignors, by mesne assignments, to Robert H. Berg,
Elmhurst, Ill.
Filed Aug. 14, 1964, Ser. No. 389,667
4 Claims. (Cl. 235—92)

This invention relates to an electronic pulse analyzer computer which operates with a high degree of accuracy and reliability to rapidly produce output data of most useful form as to the effective distribution of pulses within a spectral range. The computer is uniquely simple in principle and thus comparatively inexpensive in construction, uses a minimum number of components and yet is quite versatile, being readily adapted to a variety of applications.

The computer may be used for example in the analysis of pulses developed by a particle sensor from particles of any of a variety of materials such as a ceramic or a pigment, or a bread flour or an air contaminant dust. In one known type of sensor, the particles are disposed in a dilute suspension in conducting liquid and are passed through a sensing zone to cause changes in the electrical resistance between electrodes in opposite sides of the zone, and to produce pulses each having an amplitude proportional to the volume of the particle. To determine the size distribution of the particles, the pulses may be applied through one or more size-discriminating threshold circuits to counters, to yield frequency information with regard to the number of particles in one or in each of a plurality of size ranges.

Such frequency distribution information is very useful in some applications, but in many applications it has been found that further computations are required to obtain data in most usable form. By way of example, a very useful type of information is in the total volume or mass of particles in the various size ranges. To obtain such information with prior systems, it has been necessary to perform conversion operations via human or machine computation wherein the average or mean volume of the particles in each contiguous size range is determined and then multiplied by the total number of particles in the range, as obtained from the frequency counting.

In a computer constructed according to this invention, a plurality of pulse factoring computer channels are provided each arranged to produce an output signal in response to application of an integer number of input triggering signals, the integer number being the inverse of a certain operational factor assigned to each channel. Triggering signals are applied to the computer channels from threshold channels which respond to input pulses in contiguous value ranges. The operational factors of the computer channels and the mean values of the value ranges of the associated threshold channels are in inversely related progressions such that each computer channel output signal represents the same accumulative effect with respect to a parameter to which the value of the input pulses is functionally related.

With this arrangement, distribution information in most suitable form may be directly and rapidly obtained without using the frequency counters and conversion operations or complex conventional computer circuits of prior systems, which operate on the mean size value and the total number of particles in each size classification. No such conversion operations or complex circuits are required and at the same time, the information obtained is highly accurate.

According to an important feature of the invention, threshold programming units are provided of a plug-in or otherwise readily interchangeable type such that the computer can be readily adapted to supply desired output information in a variety of applications. Each such interchangeable threshold programming unit may preferably comprise a plurality of resistors having predetermined relative values, while other circuitry of the threshold channels and the computer channels is of comparatively fixed construction.

According to another important feature of the invention, binary stages are used in the computer channels in a manner to obtain highly reliable operation. Such binary stages may be used with feedback arrangements to obtain trinary, decade or other dividing operations, and the operational factors of the computer channels are then arranged in a corresponding progression. In one preferred form of system as illustrated herein, however, the operational factors of the computer channels are in a binary progression. With this feature, it is possible to use straight binary stages in the computer channels and the design of the system is simplified, with each computer channel having respectively one less and one more binary stage than the channels adjacent thereto. At the same time, the versatility of the computer is preserved because any desired output information can be obtained by appropriate selection of the threshold values, which may in some cases be in a binary progression inverse to that of the channel operational factors and in other cases in a different type of inverse progression.

A further important feature of the invention is in the use of two or more ampliers ahead of the threshold circuits, operative at different levels to extend the range of measurable pulse sizes without exceeding the useful dynamic range of any single amplifier.

Additional features of the invention reside in particular circuits in the threshold and computer channels, operative to provide a high degree of accuracy and reliability while using a minimum number of components.

It will be appreciated that the invention has a wide variety of applications. The pulse value to which the threshold channels respond may be the amplitude of a pulse, the duration of a pulse, or the average or integrated value of a pulse, and the parameter represented by the final output signal may represent any parameter functionally related to the pulse value so measured.

As indicated above, one application in which the invention is particularly advantageous is in the analysis of pulses derived from a particle sensor and it is believed that the various features of the invention will be clarified by consideration of the general characteristics of particle sensing systems and the presentation of data therefrom with the system of this invention.

Particle sensors commonly involve the flow of a rather dilute suspension of particles through a sensing zone, wherein the particles may be sensed by electrolytic, photic or sonic means. In such sensors, it is important to limit coincident passage of particles through the sensing zone to negligible error effect. This is accomplished by using an average number of particles per given volume of the fluid which is sufficiently small in relation to the zone volume, and by keeping the zone small also.

In all of such particle sensors, a spectrum of electrical pulses is produced, corresponding to and proportional to the size spectrum of the particulate matter. The design and usage of the sensing unit is critical, as the electrical pulse shape depends on zone sensitivity and traverse velocity profiles, as well as the response characteristics of the electronic pick-up element and amplifier.

A further important consideration is that the pulse size is proportional to particle volume in the case of electrolytic sensors, or area in the case of photic or sonic sensors, while particle quantity is available directly in the form of numbers of particles. Accordingly, data conversion via human or machine computation is usually necessary to express particle size as diameter and particle quantity, as volume or weight, area, or frequency distribution, either cumulative or incremental.

The most useful form of data presentation varies from one technical field to another, but some generalizations may be made.

In particular, for many materials including those which are to play some part in a chemical process (catalysts, explosives, ores, pharmaceuticals) or in forming some reconstituted product (bread, mortar, paper, porcelain), the volume or weight distribution is most appropriately used in correlating performance of the particulate matter. The cumulative data form is usual, but the incremental form may be used where the utmost sensitivity of data presentation is required.

For other particles, including systems which are to form coatings (photographics, paints, powdered lubes, phosphors), an area distribution is more often the most useful.

In still other particulate systems, data is best expressed in the form of frequency distributions, as in biological entities (cells, etc.), air and liquid contaminants of low concentrations, textile fiber diameters, etc.

Obviously, the mode of data presentation determines in part the very worth of particle size measurements.

The system of this invention inherently performs the conversion of data from a frequency basis to an area or volume basis and involves an integration, that is, the summing of particle volumes or areas in incremental, adjacent size bands or channels. In effect, this summing is accomplished by applying a factor (the average particle volume or area for each channel) to the number of particles measured in the corresponding channel, to obtain incremental volumes or areas of the particulate systems. These increments may then be added to obtain a total system volume or area, on which the usual percentage expressions of distribution may be based.

Since distributions are expressed percentage-wise, the incremental factors may have any arbitrary values which need only be in the same ratio to one another as the average particle dimensions for those size bands used in the summation. If the inter-channel size ratios are constant, the plot of the logarithm of particle size versus incremental distribution may be formed directly from the incremental data (volume or area), using an arbitrary ordinate scale instead of percentage, which is usually adequate for data interpretation purposes.

The system of this invention is operable to classify pulse values into multiple channels and performs data integration automatically by combining a programmed pattern of the operational factors of the computer channels and a corresponding programmed pattern of the mean values of the associated threshold channels, preferably with constant ratios between the factors of adjacent computer channels and constant ratios between the mean values of adjacent threshold channels, usually, but not necessarily, inverse progression.

As a first example, if the input pulses have values proportional to particle volume and it is desired to obtain outputs in terms of volume increments, a 2:1 ratio may be used between thresholds of the threshold channels, with a 2:1 or binary ratio being also used between the operational factors of the computer channels.

As a second example, if the input pulses have values proportional to particle volume and it is desired to obtain outputs in terms of area increments, a $2^{3/2}:1$ or sesquibinary ratio may be used between thresholds of the threshold channels, with a 2:1 or binary ratio being used between the operational factors of the computer channels.

As a third example, if the input pulses have values proportional to particle area and it is desired to obtain outputs in terms of area increments, a 2:1 or binary ratio may be used between thresholds of the threshold channels, with a 2:1 or binary ratio being used between the operational factors of the computer channels.

As a fourth example, if the input pulses have values proportional to particle area and it is desired to obtain outputs in terms of volume increments, a $2^{2/3}:1$ ratio may be used between thresholds of the threshold channels, with a 2:1 or binary ratio being used between the operational factors of the computer channels.

This invention contemplates other objects, features and advantages which will become more fully apparent from the following detailed description taken in conjunction with the accompanying drawings which illustrate a preferred embodiment and in which:

FIGURE 1 diagrammatically illustrates a system including a particle sensor and a pulse analyzer computer constructed according to this invention and operative on pulses produced by the particle sensor;

FIGURE 2 is a circuit diagram of portions of one channel of the computer shown in FIGURE 1;

FIGURE 3 is a circuit diagram of a binary counter stage used in pulse factoring computer channels of the computer shown in FIGURE 1;

Figure 4:
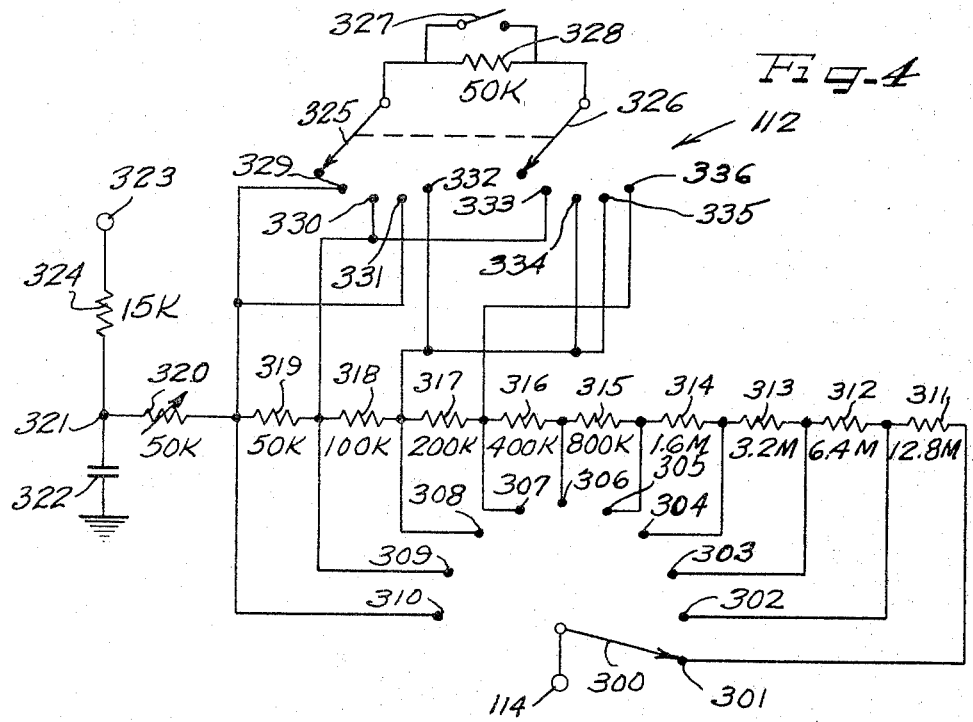
FIGURE 4 is a circuit diagram of an aperture current control circuit of the computer shown in FIGURE 1.

Reference numeral 10 generally designates a system which includes a pulse analyzer computer 11 constructed according to this invention. The computer may be used in other applications but as illustrated is specifically designed to be operative on the size spectrum of amplified voltage pulses produced by a particle sensor generally designated by reference numeral 12. In response to such pulses, the computer 11 develops output pluses on eight output lines 13–20, such pulses being applied to counters 21–28.

By way of example, the input pulses may have values proportional to particle volume, counter 21 may register the total volume flow (or mass flow, assuming a uniform density) in a given time interval of particles having a size in a range of from $1–2 \times 10^{-9}$ cc., the counter 22 may register the total volume or mass flow of particles having a size in a range of from $2–4 \times 10^{-9}$ cc., the counter 23 may register the total volume or mass flow of particles having a size in a range of from $4–8 \times 10^{-9}$ cc., and so on, with the counter 28 operative to register the total volume or mass flow of particles in a range of from $128–256 \times 10^{-9}$ cc. Thus the distribution of the particles according to size ranges is indicated. The particles may be of a material to be used in a chemical process, in forming a material such as a ceramic or a pigment, in making a photographic coating, or for any appliction where the size distribution is significnt.

The illustrated computer 11 comprises a pulse factoring computer section 30 having eight channels operative to develop the output signals on lines 13–20 in response to input triggering signals applied on lines 31–38 from a pulse channeling circuit 40. In accordance with this invention, each channel of the pulse factoring computer 30 is operative to produce an output signal in response to application of an integer number of input triggering signals, the integer number being the inverse of a certain operational factor assigned to each channel. Such operational factors and the mean values of the value ranges of the associated threshold channels are in inversely related progressions. In the illustrated system, the operational factors of a pulse factoring computer section 30 are in a binary progression which permits use of straight binary stages and a simplified design of the system, while preserving the versatility thereof.

In particular, the most sensitive channel (the channel which responds to input triggering signals produced in response to input pulses in the lowest value range) comprises seven cascaded binary stages 41–47, the output of the final stage 47 being applied to an output stage or counter driver 48 which develops the output signal on line 13, applied to the counter 21. Similarly, the second channel comprises six binary stages 49–54 and an output stage 55, the third channel comprises five binary stages 57–61 and an output stage 62, the fourth channel comprises four binary stages 63–66 and an output stage 67, the fifth channel comprises three binary stages 69–71 and an output stage 72, the sixth channel comprises two binary stages 73 and 74 and an output stage 75, the seventh channel comprises a single binary stage 76 and an output stage 77. In the eighth channel, signals on the line 38 are applied directly to the input of an output stage 78.

With this arrangement, 128 input triggering signals must be applied on line 31 to develop a final output signal on the line 13. The operational factor of the first channel, which is the inverse of the number of triggering signals necessary to develop an output signal, is therefore $1/128$. Similarly, the second, third, fourth, fifth, sixth, seventh and eighth channels have operational factors of $1/64$, $1/32$, $1/16$, $1/8$, $1/4$, $1/2$ and 1, respectively. It will be noted that such operational factors are in a binary progression.

In accordance with this invention, the pulse channeling section 40 has a plug-in or otherwise readily interchangeable threshold unit 80 connected thereto and supplied with input pulses which are derived from the sensor 12, in an arrangement such that the mean values of value ranges of threshold channels are in a progression in inverse relation to the progression of the operational factors of the pulse factor computer section 30, and each final output signal on any one of the lines 13–20 represents the same cumulative effect with respect to a certain parameter functionally related to the values of the input pulses, without regard to the number of input pulses required to produce a particular output signal.

The pulse channeling section 40 comprises eight output stages 81 connected to the lines 31–38, preferably in the form of emitter-followers to perform isolation and impedance transforming functions. The inputs of the output stages 81 are connected to the outputs of eight gate circuits 82 to which signals are applied from pulse register circuits 83, with veto signals being applied from each pulse register to the gate circuit for the next more sensitive channel. In order to limit the maximum value of input pulses which might otherwise cause operation of the gate circuit for the least sensitive channel, an additional pulse register circuit is provided to make a total of nine pulse register circuits 83. In other words, nine "lines" are required to form eight "spaces." The inputs of the pulse register circuits 83 are connected to the outputs of pulse amplifiers 84, the inputs of which are connected to the outputs of triggering and differentiating circuits 85. The inputs of the triggering and differentiating circuits 85 are connected through isolation and clipping circuits 86 to nine resistors 87–95 in the threshold unit 80. The circuits 86 also perform impedance transforming, DC blocking and zero restoration functions, as hereinbelow described.

In order to obtain a wide range of measurable pulse sizes without exceeding the useful dynamic range of any single amplifier, the threshold unit 80 is supplied with signals from first and second amplifiers 97 and 98 operated at different levels, the output of amplifier 97 being connected to resistors 87–91 and the output of the second amplifier 98 being connected to the resistors 92–95. The input of the first amplifier 97 is connected directly to the movable contact of a gain selector switch 99 while the input of the second amplifier 98 is connected to the gain selector switch 99 through a stage 100, which is preferably a cathode-follower which performs isolation and impedance matching functions, and which also provides a level reduction, such that the signal applied to the input of the amplifier 98 is a predetermined fraction of the input signal to the stage 100. With the binary progression as used in the illustrated system, and to simplify the design of the threshold circuit 80, the ratio of the input voltage of the circuit 100 to the output volage thereof may preferably be 32:1.

The gain selector switch 99 has fixed contacts connected to ground and to junctions between a plurality of resistors 101–106 connected in series between ground and the output of an impedance matching and isolation stage 107, preferably a cathode-follower having an input connected to the output of a pre-amplifier 108.

The input of the pre-amplifier 108 is connected to one electrode 109 of the illustrated particle sensor 12, which has a second electrode 110 connected to ground. Electrode 109 is connected to an aperture circuit 112 having an output terminal 114, circuit 112 being operative to supply current of a value such that the signal applied to the pre-amplifier 108 is substantially proportional to changes in resistance between the electrodes 109 and 110 caused by a particle traversing the aperture. The aperture circuit 112 is illustrated in FIGURE 4 and described in detail hereinbelow.

The electrode 109 is immersed in a conductive liquid 127 in a beaker 128 forming an insulating container and supported thereabove is a chamber 129 having a reduced diameter lower end portion 130 extending downwardly into conductive liquid 127. Disposed in the lower end of the portion 130 is an aperture 131 having a diameter of a size somewhat larger than the size of the largest particle to be passed through. The upper end of the chamber 129 is connected to a vacuum source, not shown, a shut-off valve 132 being provided in the upper end of the chamber 129.

In operation, the vacuum draws the conductive liquid from the beaker 128 up through the aperture 131 and into the chamber 129. The electrode 110 is disposed in the chamber 129 and as each particle passes through the aperture 131, the resistance between the electrodes 109 and 110 is increased in proportion to the volume of the particle, to produce voltage pulse of proportional amplitude which is applied to the pre-amplifier 108. It may be noted that in some cases, the resistance between electrodes may be decreased by passage of the particle through the aperture, depending upon the composition of the particle and the type of conductive liquid and the current applied.

The particle sensor 12 incorporates known means for metering flow of a predetermined volume of conductive liquid through the aperture, and for initiating and terminating operation of the computer at the start and end of the flow of the predetermined volume of liquid. In particular, the chamber 129 communicates with the upper end of one leg 135 of a generally U-shaped tube 136 having a second leg 137 open at its upper end, the tube 136 being partially filled with mercury which is drawn from the leg 137 and upwardly into the leg 135 in response to vacuum from the chamber 129. The leg 137 has a generally horizontal portion 138 with contacts 139 and 140 sequentially therein, forming start and stop contacts, respectively.

In operation, the valve 132 is opened to a regulated vacuum source to withdraw liquid from the top of the chamber 129, and the mercury is withdrawn from the leg 137 into the leg 135 until the level of the mercury is below the start contact 139. The vacuum line is then closed by means of the valve 132, and the liquid is withdrawn from the beaker 128 up through the aperture 131 into the chamber 129, as the mercury rebalances in the leg 137 of the device 136. As the liquid flows, the level of the mercury rises in the leg 137 until it contacts the start contact 139, whereupon a signal is applied to a trigger control circuit 141 and also to a reset circuit 142, connected to the pulse registers 83. As the flow continues, the mercury will reach the stop contact 140, whereupon a signal is applied to the trigger control circuit 141.

When the trigger control circuit 141 is operated by signal from the start contact 139, a timer trigger circuit 143 is enabled and in response to the first pulse thereafter from the triggering and differentiating circuit 85 for the most sensitive channel, a triggering signal is applied to a timer circuit 144. Timer circuit 144 operates for a comparatively short time interval, preferably on the order of one microsecond, to enable the gate circuits 82, provided a veto signal is not then applied from the next less sensitive channel. At this time, a signal is applied from one of the pulse registers 83 through the one of the gate circuits 82 which is enabled, and to one channel of a pulse factoring computer 30 through the corresponding output stage 81.

At the end of the time interval of operation of the timer circuit 144, a signal is applied to the reset circuit 142 which applies a signal to all of the pulse registers 83, to reset such circuits to their initial condition.

When a final stop signal is developed from the contact 140, it is applied to the trigger control circuit 141 and disables the timer circuit 143 to prevent operation of the timer circuit 144 and thereby maintain all of the gate circuits 82 in closed positions.

In FIGURE 2, reference numeral 200 generally designates one channel of the pulse channeling circuit 40 comprising the isolate and clip and DC blocking and zero restoration circuit 86, the trigger and differentiating circuit 85, the pulse amplifier circuit 84, the pulse register circuit 83, the gate circuit 82 and the output stage 81.

One of the resistors 87–95 of the threshold circuit 80 is connected to the base of a transistor 201 which is also connected to a ground lead 202 through a resistor 203. The transistor 201 has its collector connected to a lead 204, and its emitter connected to the lead 202 through resistor 205. Resistor 205 is connected to resistor 206 through capacitor 207 and transistor 208. The capacitor 207, the emitter of the transistor 208 and the resistor 206 are connected to the base lead of a transistor 209.

A positive pulse at the emitter of transistor 201 is applied to the base of the transistor 209 and may leave the capacitor 207 with a small but definite charge which might not be fully dissipated before the next pulse, the time constant of capacitor 207 and resistor 206 being large. However, the transistor 208 is caused to conduct a current sufficient to discharge the capacitor 207 to a negligible value, and thus provides DC restoration.

The transistor 209 has its collector connected to the lead 204 and its emitter connected to the lead 202 through a resistor 210 and a diode 211. The resistor 210 and diode 211 are connected through a resistor 212 to a tunnel diode 213 which operates in response to a voltage pulse above a certain level to generate an amplified pulse which is applied to a differentiating circuit comprising a capacitor 214 and a resistor 215. Diode 211 safely limits the voltage which may be applied to tunnel diode 213.

The differentiated pulse is applied through a resistor 216 to an amplifying transistor 217 having its collector connected through resistor 218 to line 204 and through a capacitor 219 to a circuit point connected to line 202 through a diode 220 and to the base of a transistor 221 through a resistor 222.

The base of transistor 221 is connected to line 202 through a resistor 223 and is also connected through a resistor 224 and a capacitor 225 to line 204.

The collector of the transistor 221 is connected to a resistor 228, a resistor 229 and a resistor 230, while the emitter of transistor 221 is connected to the line 202 through a capacitor 231 and a resistor 233. The collector of transistor 226 is connected to a resistor 232, capacitor 225 and resistor 224, while the emitter thereof is connected to the emitter of transistor 221 and to the line 202 through a resistor 233. The collector of a transistor 234 is connected to the base of transistor 226, resistor 229, and the line 202 through a resistor 235, while the base of transistor 234 is connected to the line 202 through a resistor 237, and to a line 238 through a resistor 239.

A transistor 240 has its collector connected to the line 204, and its emitter connected to the line 202 through a resistor 241, while its base is connected through a capacitor 242 to the output of the circuit 82 and also through a resistor 243 to line 202. In the circuit 82, a diode 245 has its anode connected to a resistor 246, and the capacitor 242 and the resistor 230, while the cathode of the diode 245 is connected to a line 247.

In operation, a pulse, which is generated at the particle sensor 12 and then amplified by one of the first and second amplifiers 97 and 98 is applied to the base of transistor 201 through the threshold resistor circuit 80. The transistor 201 is used to isolate the threshold trigger and differentiating circuit 85 from the amplifier, while at the same time limiting the amplitude of the applied pulse to that of the supply voltage.

If a pulse of proper amplitude is applied to the base of the transistor 201, it will be passed to the trigger and differentiating circuit 85 through capacitor 207 and transistor 209. The transistor 208 is used to insure that the zero reference of the applied pulse is at ground potential, and the transistor 209 is used to drive the threshold diode 213. A differentiated pulse, from the resistor 215 and capacitor 214, is amplified by the transistor 217 and then applied to the pulse register circuit 83. The pulse register circuit 83 will send a veto pulse through diode 127 to the next most sensitive channel where it will block further processing of pulses in that channel.

It can be seen that a pulse with the appropriate amplitude, say sufficient to activate the third most sensitive channel, will also activate the first and second most sensitive channels. The veto pulse from the third most sensitive channel is applied to the gate circuit 82 of the second most sensitive channel, while the veto pulse from the second most sensitive channel is applied to the gate circuit 82 of the first most sensitive channel. Therefore, an input pulse of given amplitude will appear on the output of the channel corresponding to that amplitude and will have no effect on the output of the channels of lesser sensitivity. Once the pulse has passed the gate circuit 82 it applies to an output transistor 240 which is used as an emitter-follower to drive the cable and thus provide a suitable source for the first binary counter.

FIGURE 3 shows the circuit of the binary counter 41 of the pulse factoring computer 30, the circuits of the other binary counters being identical thereto. The counter 41 has a pair of transistors 275 and 276 which have their emitters connected together and to a line 277 through a resistor 278 and a capacitor 279. A pair of input capacitors 280 and 281 are connected to an input terminal 282. The other end of the input capacitor 280 is connected to the base lead of transistor 275, a resistor 284, a resistor 299, and a capacitor 283. The other end of the input capacitor 281 is connected to the base lead of transistor 276, a resistor 285, a resistor 286, a resistor 287 and a capacitor 288. The transistors 275 and 276 have connected to their collectors a pair of resistors 290 and 291 respectively. The transistors 275 and 276 each have feedback connection of their collectors to the base of the other, through resistors 286 and 284 respectively. A resistor 293 is connected to the resistor 291 and the collector of the transistor 276. The transistor 275 has its base connected to the line 277 through a resistor 299.

The binary counter in FIGURE 3 functions as a bistable circuit wherein one transistor is conductive while the second transistor is non-conductive. No change will occur until a positive triggering pulse is applied to the input capacitors 280 and 281 whereupon the non-conducting transistor will be rendered conductive which in turn will render the conducting transistor non-conductive.

When the transistor 275 is conductive and the transistor 276 is non-conductive the potential at resistor 293 is near the applied voltage. Upon application of a triggering pulse to capacitors 280 and 281, the transistor 275 is rendered non-conductive while the transistor 276 is rendered conductive, which will allow the maximum current to flow through transistor 276 and resistor 291. This action will lower the voltage at resistor 293. Upon application of a second triggering pulse to the capacitors 280 and 281, the transistor 275 is rendered conductive while the transistor 276 is rendered non-conductive. This is the condition of the circuit before the first triggering pulse was applied. The binary circuit 270 is then a count divider in that it will require two triggering pulses applied to the input to provide one triggering pulse of the output.

An important feature of the invention is that the resistors of the threshold circuit 80 have values such that the mean values of the value ranges of the threshold channels are in a progression in inverse relation to the progression of the operational factors of the pulse factoring computer, such that each computer channel output signal represents the same accumulative effect with respect to a parameter to which the value of the input pulses is functionally related. By way of illustrative example and not by way of limitation, the illustrated computer may be used to obtain outputs in terms of volume increments, with input pulses applied thereto having values proportional to particle volume, as would be the case with the illustrated particle sensor 12. For such an application, a 2:1 or binary ratio may be used between threshold of the threshold channels, with a 2:1 or binary ratio being also used between the operational factors of the computer channels, as is the case with the illustrated computer wherein the straight binary stages are used.

To obtain the binary progression of the thresholds of the threshold channels, the resistors of the threshold circuit 80 may have the following values.

| Reference numeral: | Value, ohms |
| --- | --- |
| 87 | 34,000 |
| 88 | 77,000 |
| 89 | 164,000 |
| 90 | 336,000 |
| 91 | 682,000 |
| 92 | 34,000 |
| 93 | 77,000 |
| 94 | 164,000 |
| 95 | 336,000 |

In conjunction with such resistance values, the input resistor for each of the isolation and clipping stages 86 may have a value of 10,000 ohms to produce an effective input impedance of 9,000 ohms at the input of each emitter-follower stage.

Another feature of the invention is in the provision of control and calibration means in the aperture current control circuit 112 such that the proper current can be readily applied without continual recalibration procedures and without the need to make corrections on output data, which might otherwise be required to correct errors arising from changes in aperture size and other operating conditions.

Referring to FIGURE 4, the output terminal 114 of the aperture current control circuit 112 is connected to a movable selector switch contact 300 which is selectively engageable with fixed contacts 301–310. Resistors 311–319 are connected respectively between contacts 301–309 and contacts 302–310 while an adjustable resistor 320 is connected between contact 310 and a circuit point 321, connected to ground through a capacitor 322 and connected to a supply voltage terminal 323 through a resistor 324.

With this arrangement switch contact 310 may be adjusted to obtain a pulse amplitude or height in a proper range of values, under various conditions of operation, such as to cause satisfactory operation of the size-sorting and computer circuitry.

The resistors 311–319 may be precision resistors with values designed to cause the height or amplitude of an output pulse at the terminal 114 to increase by a factor of two as the contact 300 is moved each step in a counter-clockwise direction. Thus as indicated on the drawing, resistor 311 may have a value of 12,800K (12.8 megohms), resistor 312 a value of 6400K, resistor 313 a value of 3200K, and so on, while resistor 320 might have a value of 50K. If the aperture resistance were very low in relation to the total series resistance between the voltage supply terminal 323 and ground and if resistor 324 had a low value, counterclockwise movement of contact 300 through each step would result in accurate doubling of the pulse height. It is found however that in practice such doubling of pulse height does not take place, due to an appreciable aperture resistance, stray or leakage resistances in the circuit, the input impedance of the preamplifier 111, and other factors.

In accordance with this invention, a very simple but effective and accurate calibration circuit is provided. In particular, the resistor 320 is made adjustable and ganged switch contacts 325 and 326 are connected together either through a shorting switch 327 or through a fixed precision resistor 328, which as indicated may have a value of 50K. Contact 325 is selectively engageable with contacts 329–332, respectively connected to contacts 310, 309, 310 and 308 while contact 326 is selectively engageable with contacts 333–336, respectively connected to contacts 309, 308, 308 and 307.

In an "off" position of ganged contacts 325 and 326 as illustrated resistor 320 may be adjusted from its maximum value of 50K down to zero to remove up to 50K from the resistance of the series circuit. In a first position of the ganged switch contacts 325 and 326, the 50K resistor 319 is shunted by the 50K resistor to remove 25K from the series circuit and to provide a 25K–75K removal range with adjustment of the resistor 320. In a second position, the 100K resistor 318 is shunted by the 50K resistor 328, to provide a 67K–117K removal range. In a third position, the 50K and 100K resistors 319 and 318 are shunted by the 50K resistor 328 to provide a 112K–162K removal range, and in a fourth position, the 200K resistor 317 is shunted by the 50K resistor 328 to provide a 160K–210K removal range. In the fourth position the shorting switch 327 may be closed to short the 200K resistor 317 and to provide a 200K–250K removal range. Thus overlapping removal ranges are provided, permitting removal of any desired resistance up to 250K from the series circuit.

In operation, the ganged switch contacts 325 and 326 are positioned and the variable resistor 320 is adjusted to remove an amount of resistance such that the pulse height is progressively increased by a factor of two as the switch contact is moved each step counterclockwise from contact 301 through contact 305. The amount of resistance removed is ascertained by trial and error, but is of the same order of magnitude as the aperture resistance, measured from terminal 114 to ground. Once adjusted for a given aperture condition, a highly accurate two-to-one relationship is maintained and the switch contact 300 may be moved to obtain a pulse height of the optimum value for operation of the computer.

It should be noted that when the aperture resistance has an appreciable value, the two-to-one relationship is not maintained at the higher current settings of the selector switch contact 300. Thus with an aperture resistance on the order of 30K, the two-to-one relationship may not be maintained with contact 300 moved beyond its seventh or eighth positions, in engagement with contacts 307 or 308. With an aperture resistance on the order of 100K, the two-to-one relationship may not be maintained beyond the fourth or fifth positions. This is no disadvantage, however, because the current in the higher switch positions would be excessive under such conditions to cause boiling of the electrolyte. Thus the higher switch positions would be unusable anyway, and the failure to obtain the two-to-one relationship is no disadvantage.

Figure 5:
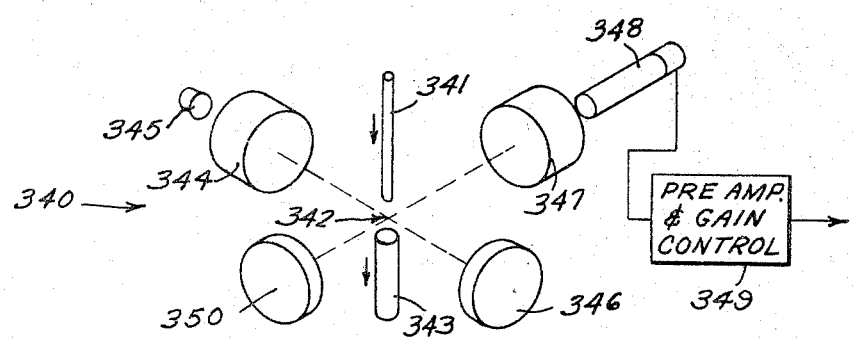
FIGURE 5 is a diagrammatic perspective view of a photic zone sensor usable in place of an electrolytic zone sensor shown in FIGURE 1.

Referring now to FIGURE 5, reference numeral 340 generally designates a photic zone sensor usable in place of the electrolytic zone sensor shown in FIGURE 1. In the sensor 340 a gas having particulate matter therein is supplied through a tube 341 into a sensing zone 342 from which it is withdrawn into a tube 343 connected to a vacuum source. The zone 342 is illuminated by a beam of light from a lens assembly 344 in front of a light source 345, with a light trap 346 having a black, light-absorbent surface being disposed in the path of the beam. Light reflected from particles passing through the zone 342 is transmitted through a lens assembly 347 to the face of a photomultiplier tube 348, which applies signals to a pre-amp and gain control circuit 349. A light trap 350 is disposed opposite the zone 342 on the axis of the lens assembly 347 and photomultiplier tube 348, to provide a dark background. This type of sensor may also be used with the light source being disposed opposite the light sensing means, and with pulses being thereby generated in response to particles blocking the light.

In general, the photic type of sensor produces pulses having values proportional to particle area. To obtain outputs in terms of area increments, a 2:1 or binary ratio may be used between thresholds of the threshold channels, while to obtain outputs in terms of volume increments, a 2⅔:1 ratio may be used between thresholds of the threshold channels with a 2:1 or binary ratio being used between the operational factors of the computer channels.

It is also possible to use the pulse analyzer computer of this invention with other types of particle sensors, such as a sonic zone sensor wherein a particle is detected by reflection of an ultrasonic beam in a liquid medium, and the computer may also be used with other types of devices operative to generate pulses which vary in amplitude according to a particular parameter.

It will be understood that modifications and variations may be effected without departing from the spirit and scope of the novel concepts of this invention.

We claim as our invention:
1. In a pulse data converter responding to sequential pulses each having a height proportional to a certain parameter, comprising:
   a pulse height analyzer having a plurality of adjustable size level discriminators forming a progression of adjacent pulse size channels; and
   an array of factoring channels for receiving the outputs of the said pulse height analyzer channels and dividing the number of pulses in the respective channels by a progression of integers;
   whereby, the progression of pulse size levels and the progression of channel factors combine to produce factoring channel output signals to drive a readout device which represent the same accumulative effect in each channel with respect to said certain parameter.
2. A pulse data converter according to claim 1 wherein said certain parameter is volume.

3. A pulse data converter according to claim 2 wherein, said array of factoring channels has binary stages connected in cascade such that each channel has one more binary stage than the next largest pulse size channel.
4. A pulse data converter including:
   a pair of electrodes immersed in a conductive liquid;
   an aperture member between said electrodes;
   circuit means for supplying current to said electrodes to develop voltage pulses proportional to particle volume in response to changes in resistance between said electrodes caused by passing of particles through said aperture member;
   pulse signal amplifying means for receiving said voltage pulses;
   a plurality of threshold channels for receiving said amplified voltage pulses from said amplifying means forming a pulse height analyzer in which each of said threshold channels produce one output pulse for each input pulse having a pulse height which falls in the size levels defining each channel;
   the improvement therein comprising, an array of factoring channels for receiving the output pulses from said pulse height analyzer channels and dividing the number of pulses in the respective channels by a progression of integers such that each output pulse from each of the factoring channels equals one relative unit of particulate volume.

References Cited

UNITED STATES PATENTS

| | | | |
|---|---|---|---|
| 2,375,413 | 5/1945 | Guenther | 175—320 |
| 2,541,039 | 2/1951 | Cole | 328—116 |
| 2,652,198 | 9/1953 | Kennedy | 235—132 |
| 2,656,508 | 10/1953 | Coulter | 324—71 |
| 2,665,846 | 1/1954 | Gilbert | 235—132 |
| 2,669,388 | 2/1954 | Fox | 235—92 |
| 2,825,872 | 3/1958 | Stubbs et al. | 324—71 |
| 2,920,525 | 1/1960 | Appel et al. | 88—14 |
| 2,927,207 | 3/1960 | Fiehrer et al. | 328—116 |
| 2,988,275 | 6/1961 | Thomason | 235—132 |
| 3,052,412 | 9/1962 | Baskin | 235—164 |
| 3,127,505 | 3/1964 | Gustavson | 235—92 |

OTHER REFERENCES

R. H. Berg: "Electronic Size Analysis of Subsieve Particles by Flowing Through a Small Liquid Resistor," ASTM Special Technical Pub. No. 234; Symposium on Particle Size Measurements, pp. 245–258.

Gucker, Jr., and O'Konski: "An Improved Photoelectronic Counter for Colloidal Particles Suitable for Size-Distribution Studies," Journal of Colloid Science, pp. 541–560.

MALCOLM A. MORRISON, *Primary Examiner.*

K. MILDE, *Assistant Examiner.*